(12) United States Patent
Miyazawa et al.

(10) Patent No.: US 7,554,754 B2
(45) Date of Patent: Jun. 30, 2009

(54) LENS BARREL

(75) Inventors: Takashi Miyazawa, Hachioji (JP);
Mitsuru Toyama, Hidaka (JP)

(73) Assignees: Olympus Corporation, Tokyo (JP);
Olympus Imaging Corp., Tokyo (JP)

( * ) Notice: Subject to any disclaimer, the term of this patent is extended or adjusted under 35 U.S.C. 154(b) by 105 days.

(21) Appl. No.: 11/786,560

(22) Filed: Apr. 11, 2007

(65) Prior Publication Data

US 2008/0252998 A1   Oct. 16, 2008

(51) Int. Cl.
*G02B 7/02* (2006.01)
*G02B 15/14* (2006.01)
(52) U.S. Cl. ........................ 359/811; 359/699
(58) Field of Classification Search ............ 359/811
See application file for complete search history.

(56) References Cited

U.S. PATENT DOCUMENTS

2001/0026401 A1 * 10/2001 Koiwai et al. ............ 359/699

* cited by examiner

*Primary Examiner*—Jordan M. Schwartz
*Assistant Examiner*—James C Jones
(74) *Attorney, Agent, or Firm*—Straub & Pokotylo; John C. Pokotylo

(57) ABSTRACT

A lens barrel has a first group frame provided with a rotating frame having a cam groove and made of a synthetic resin and a cam follower made of a synthetic resin integrated with the circumferential face for relative movement with the rotating frame and engaged with the cam groove, in which a shaft member made of metal is inserted into the center portion of the cam follower. If the lens barrel is dropped and the first group frame undergoes a relatively large impact force, the impact force acts between the cam groove and the cam follower, but since the shaft member is inserted into the cam follower as mentioned above, breakage of a root portion of the cam follower is prevented, and since the cam groove and the cam follower are both resin, plastic deformation on the cam groove side is also prevented.

11 Claims, 9 Drawing Sheets

LENS BARREL

BACKGROUND OF THE INVENTION

1. Field of the Invention

The present invention relates to a structure of a lens barrel incorporating a plurality of frame members having a cam mechanism portion in which a cam groove is engaged with a cam follower.

2. Description of the Related Art

A conventional lens barrel has a cam mechanism portion including a cam groove and a cam follower for advancing/retreating a lens frame in the lens optical axis direction. In this lens barrel, the cam groove and the cam follower are disposed at two different frame members, respectively, and rotation of one of the frame members is transmitted to the other frame member for advance/retreat through the cam groove and the cam follower.

FIGS. 14, 15 show a partial sectional view around the cam groove and the cam follower in respective different constructions of the cam mechanism portion of the above conventional lens barrel. In the cam mechanism portion of the conventional lens barrel shown in FIG. 14, a cam groove 101a is provided at a cam frame 101, a cam follower 103 made of metal engaged with the cam groove 101a is pressed into a fitting hole 102a and held at a moving frame 102 supported by the cam frame 101. On the other hand, in another conventional cam mechanism portion shown in FIG. 15, a cam groove 104a is provided at a cam frame 104, and a cam follower 105a engaged with the cam groove 104a is formed by integral molding at a moving frame 105 supported by the cam frame 104.

When the conventional lens having the cam mechanism portion in the structure shown in FIGS. 14, 15 is dropped on the ground in use, an impact force F0 in the optical axis direction acts on the moving frame 102 or 105. The impact force F0 is received by the cam groove and the cam follower interposed between the moving frame 105 and the cam frame 104, but depending on the magnitude of the impact force F0, the cam groove and the cam follower might be damaged, removed or the like.

For example, when a large impact force F0 acts on the cam mechanism portion shown in FIG. 14, there is a fear that a portion where the metal cam follower 103 is in linear contact with the synthetic resin cam groove 101a is strongly brought into contact and the cam groove 101a is plastically deformed as shown in a sectional view illustrating the deformed state of the cam groove and the cam follower in FIG. 16. Also, if the press-fitting length of the cam follower 103 is short, there is a fear that a shaft hole 102a of the moving frame 102 into which the shaft portion 103a of the cam follower 103 is pressed is deformed and the cam follower 103 is removed as shown in a sectional view of FIG. 17 illustrating a state where the cam follower of the cam mechanism portion is removed. Moreover, if a large impact force F0 acts on the cam mechanism portion shown in FIG. 15, there is also a fear that a sheering force and a bending moment act on the cam follower 105a integrally molded at the moving frame 105 and a crack is caused in a root portion 105b as shown in a sectional view in a damaged state of the cam follower in FIG. 18.

SUMMARY OF THE INVENTION

A lens barrel according to the present invention comprises a first frame having a cam groove and a second frame having a cam follower made of a synthetic resin integrated on the circumferential face for relative movement with the first frame and engaged with the cam groove, in which a shaft member made of a material with strength higher than that of a frame member such as metal is inserted into the center of the cam follower, and even if an external force such as an impact force acts on the first frame or the second frame and the external force acts on the cam groove and the cam follower, the lens barrel has a characteristic that can prevent breakage, removal or the like.

Other characteristics and benefits of the present invention will become apparent from the description below.

DESCRIPTION OF THE PREFERRED EMBODIMENTS

Embodiments of the present invention will be described below using the attached drawings.

A lens barrel, which is a first embodiment of the present invention, will be described using FIGS. 1 to 4. In the description below, a subject side of an optical axis of a photographing lens (first, second group lenses) is referred to as the front, while the image forming side as the rear.

Figure 1:
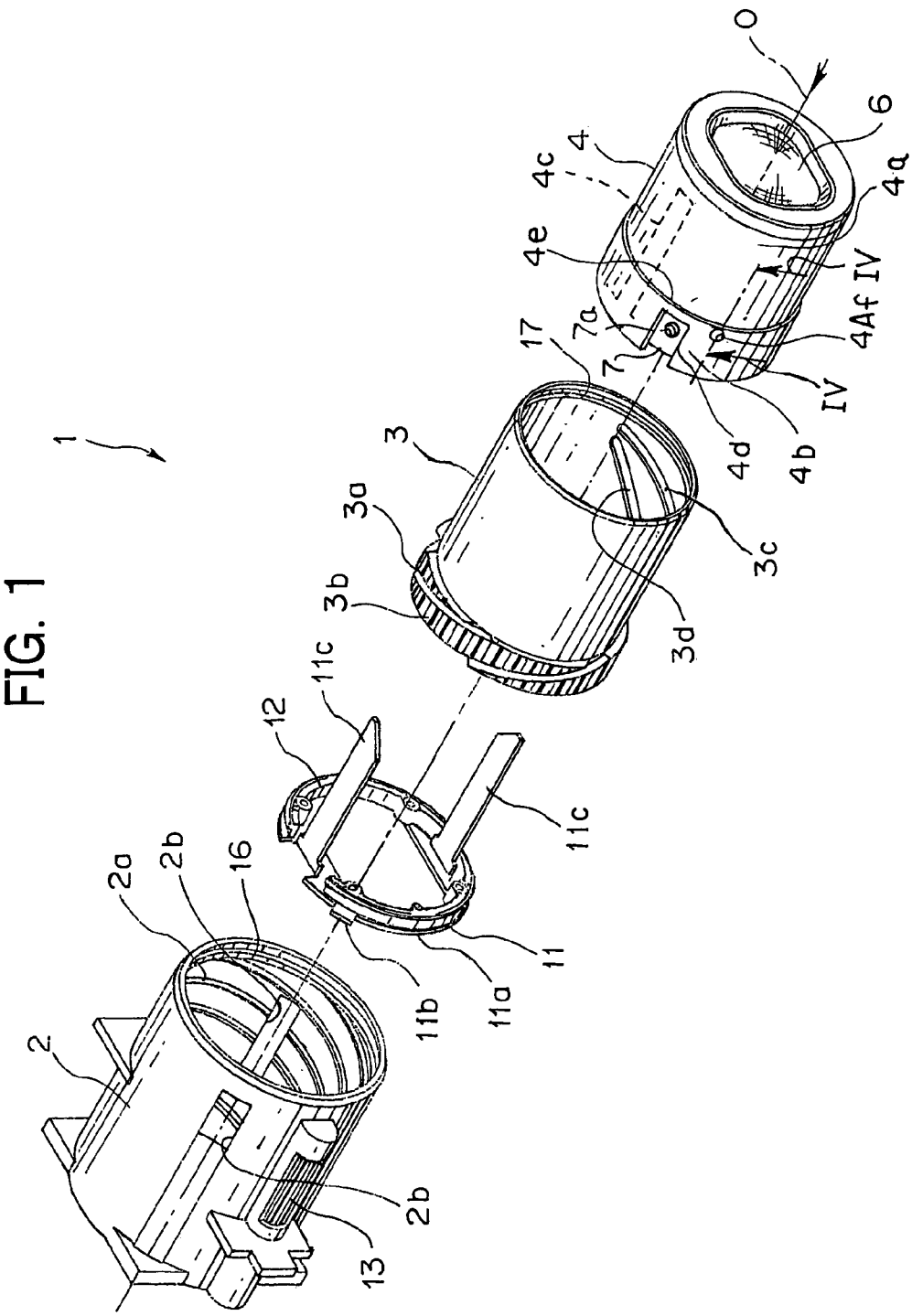
FIG. 1 is an exploded perspective view of a lens barrel of a first embodiment of the present invention.
Figure 2:
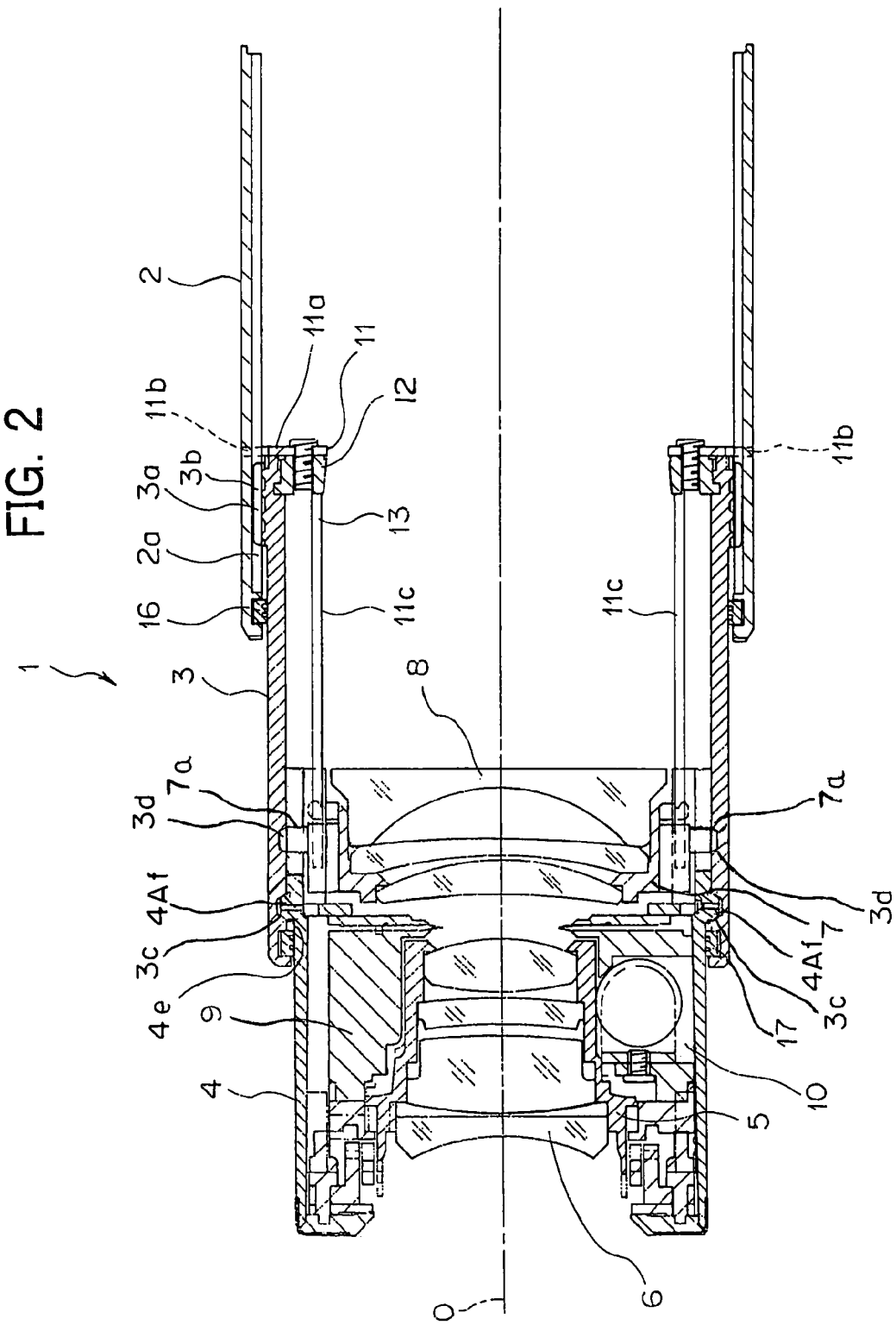
FIG. 2 is a longitudinal sectional view of the lens barrel of FIG. 1.

A lens barrel 1 of this embodiment is a lens barrel incorporated in a camera body 20 (FIG. 3) and capable of variable magnification driving by a zoom driving system. The lens barrel 1 has, as shown in FIGS. 1 and 2, a fixed frame 2 fixed to/supported by the camera body, a rotating frame 3, which is a first frame, fitted into/supported by the fixed frame 2 capable of rotation and advance/retreat, a first group frame 4, which is a second frame, supported in the rotating frame 3 and holding a first group lens 6, a second group frame 7 supported in the first group frame 4 and holding a second group lens 8, and a float key 11 supported by the rotating frame 3 for regulating rotation of the first group frame 4 and the second group frame 7.

The fixed frame 2 is a cylindrical frame member and has a female helicoid screw 2a and two straight grooves 2b along the optical axis direction provided on the inner circumference portion. Also, a driving gear 13 is incorporated in the fixed frame 2, and a seal ring 16 sliding on the outer circumference of the rotating frame 3 and having functions of dust prevention, waterproof and light shielding is fitted into the front-end inner circumference portion.

The rotating frame 3 is a cylindrical frame member made of a synthetic resin, and a male helicoid screw 3a screwed with the female helicoids screw 2a on the fixed frame 2 and a gear portion 3b meshed with the driving gear 13 are provided at the rear-end outer circumference portion in the overlapping manner, and two types of three cam grooves 3c, 3d each (each one of them is illustrated) traveling obliquely with respect to the optical axis direction are provided on the inner circumference portion. Also, on the front-end inner circumference portion of the rotating frame 3, a seal ring 17 sliding on the outer circumference of the first group frame 4 and having functions of dust prevention, water proof and light shielding is fitted into the front-end inner circumference portion of the rotating frame 3.

Figure 4:
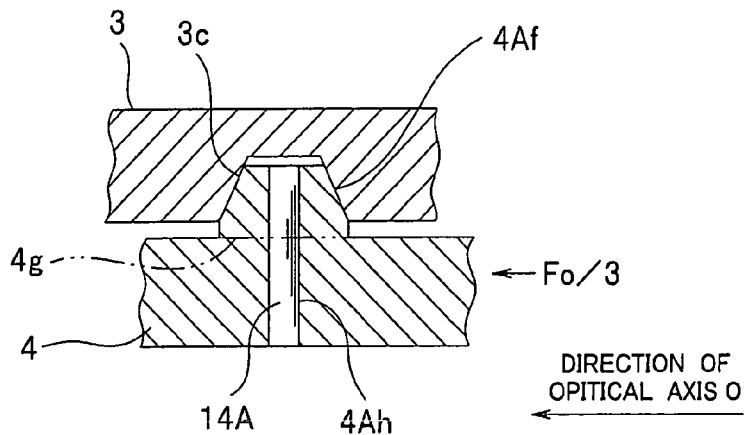
FIG. 4 is a IV-IV sectional view of FIG. 1 illustrating a section along the optical axis around the cam groove and the cam follower constituting a cam mechanism portion in the lens barrel.

The cam grooves 3c, 3d constitute a cam mechanism portion along with a cam follower, which will be described later, has an inclined surface required for mold draft at molding, and is a groove along a cam line traveling obliquely with respect to the optical axis (FIG. 4).

The rotating frame 3 is rotated/driven by the driving gear 13 through the gear portion 3b and advances/retreats in the optical axis direction while being rotated with respect to the fixed frame 2 by the female helicoid screw 2a.

The float key 11 has two projecting keys 11c extending to the front in the optical axis O direction from an annular ring portion having a center opening portion, two guide projections 11b projecting to the outer circumference side from the annular ring, and a guide ring 12 for engaging the rotating frame.

The float key 11 is supported integrally in the optical axis direction and supported in a state capable of relative rotation through the guide ring 12 with respect to the rotating frame 3 and also straightly guided by the straight grooves 2b of the fixed frame 2 through the guide projections 11b. Therefore, in the state where rotation is restricted by the fixed frame 2, the float key 11 is moved in the optical axis direction along with the rotating frame 3.

The first group frame 4 is a cylindrical frame member made of a synthetic resin, comprised by a front frame portion 4a on the front side and a rear frame portion 4b through a stepped portion 4e, and fitted into the inner circumference portion of the rotating frame 3 capable of relative rotation and advance/retreat. Inside the first group frame 4, a lens holding frame 5 is fixed. In the lens holding frame 5, the first group lens 6, a focusing driving unit 9, and a shutter unit 10 are incorporated (FIG. 2).

On the outer circumference of the rear frame portion 4b, three cam followers 4Af constituting the cam mechanism portion along with the cam grooves 3c are arranged in the state projecting in the radial direction at positions divided into three parts (only one of them is shown in FIG. 1). Also, a cutaway portion 4d for inserting a cam follower 7a of the second group frame 7, which will be described later, is arranged avoiding the position of the cam follower 4Af on the rear frame portion 4b.

The cam follower 4Af is, as shown in FIG. 4, formed by a resin integrally with the outer circumference of the first group frame 4, and the outer circumference portion has a truncated cone shape capable of engagement with the inclined face of the cam groove 3c of the rotating frame 3 and having the axis along the radial direction (direction orthogonal to the optical axis). Also, a straight shaft member 14A made of metal passes through the cam follower center and is pressed or inserted into a through hole 4Ah along the radial direction of the center portion of the cam follower 4Af and fixed by adhesion (fitted state). The shaft member 14A may be inserted by insert molding into the first group frame 4. In the above inserted state, the shaft member 14A is placed across a boundary 4g between the cam follower 4Af and the outer circumference face of the first group frame 4. Also, the both ends of the shaft member 14A is given chamfering processing. A shaft material made of steel or aluminum alloy is applied to the shaft member 14A. The similar shaft material is also applied to shaft members 14B to 14H applied to each of embodiments, which will be described later.

Moreover, a straight guide groove 4c in the optical axis direction is provided into which the key 11c of the float key 11 for restricting rotation of the first group frame 4 is slidably fitted on the inner circumference portion of the first group frame 4, and on the inner circumference portion, a straight guide groove (not shown) for restricting rotation of the second group frame 7 is also provided.

The first group frame 4 is advanced/retreated in the optical axis direction through the cam groove 3c and the cam follower 4Af with rotation of the rotating frame 3 while its rotation is restricted by the float key 11.

The second group frame 7 is a cylindrical frame member made of a synthetic resin and fitted into the inner circumference portion of the first group frame 4 while rotation is restricted, and straight advance/retreat is possible in the optical axis direction. The second group frame 7 has the second group lens 8 held on the inner circumference portion and the three cam followers 7a arranged on the outer circumference portion. The cam follower 7a is engaged with the cam groove 3d of the rotating frame 3 in the state capable of sliding.

The second group frame 7 is advanced/retreated in the optical axis direction through the cam groove 3d and the cam follower 7a with rotation of the rotating frame 3 while its rotation is restricted through the first group frame 4.

In the above lens barrel 1 of this embodiment, when it is incorporated in the camera body 20 and the camera is not in the shooting state, the rotating frame 3 and the first group frame 4 are both in the retracted positions and fed into the fixed frame 2. Then, in order to bring the camera into the shooting state, when the driving gear 13 is rotated/driven in a predetermined direction, the rotating frame 3 is fed out to the front in the optical axis direction from the rotating frame 3 while being rotated. At the same time, the first group frame 4 is fed out to a position capable of shooting in front of the rotating frame 3 in the rotation restricted state. The second group frame 7 is moved to a position capable of shooting inside the first group frame 4. After that, the lens barrel 1 is advanced/retreated by the driving gear 13 as necessary to each zooming position for shooting.

Figure 3:
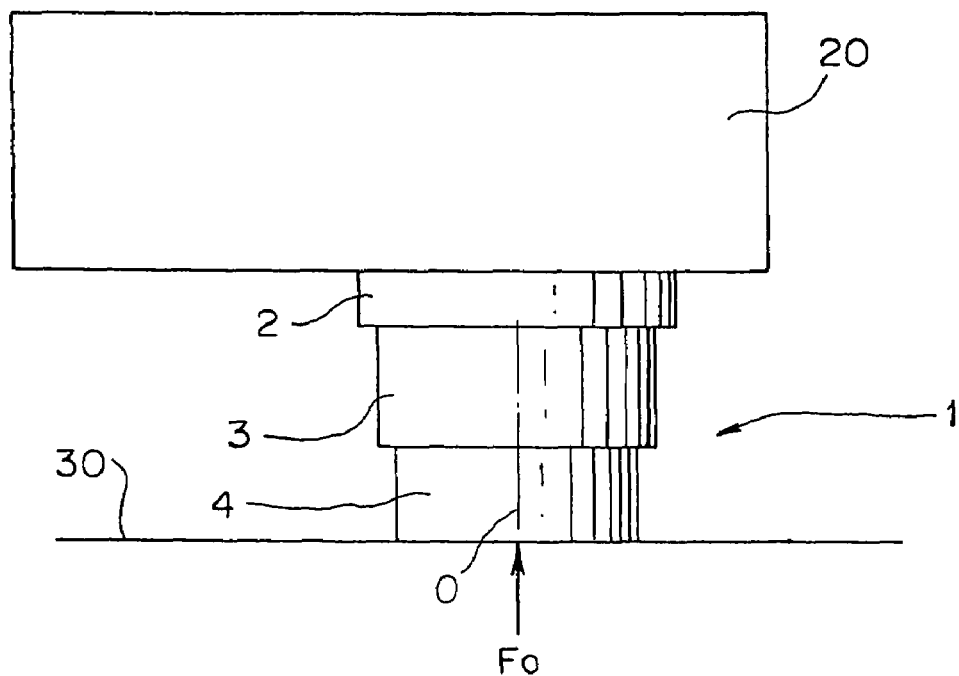
FIG. 3 is a view illustrating a state where a camera incorporating the lens barrel in FIG. 1 is carelessly dropped and the tip end of the lens barrel hits an obstacle.

In the lens barrel 1 of this embodiment, the first group frame 4 has been moved to the fed-out position projecting to the front when the camera is capable of shooting as mentioned above. If the camera is dropped in the optical axis direction with the lens barrel side downward, the front end face of the first group frame 4 hits an obstacle 30 such as a ground as shown in FIG. 3. The lens barrel 1 undergoes an external force (impact force) F in the optical axis direction. The external force F0 is undergone by the three pairs of the cam followers 4Af and the cam grooves 3c of the first group frame 4 and the rotating frame 3 and moreover, transmitted to the fixed frame 2 side. An external force F0/3 acts at a contact portion between the cam follower 4Af and the rotating frame 3 of each of the three pairs (FIG. 4), and the cam groove 3c undergoes a contact force, while the cam follower 4Af undergoes a bending moment and a shearing force.

However, even if a relatively large external force F0/3 due to the impact acts on the lens barrel 1, since the cam follower 4Af is molded integrally with the frame outer circumference, and the shaft member 14A made of metal is inserted into the center portion as mentioned above across the boundary 4g on the frame outer circumference face so that the shearing strength and bending strength of the cam follower 4Af is increased, a crack at the root portion of the cam follower 4Af or fracture of the cam follower 4Af from the frame outer circumference portion is prevented. And, being made other than a force fitted member, the cam follower 4Af may not be removed. Moreover, since the cam follower 4Af and the cam groove 3c to be the contact portion are made of a synthetic resin and not in contact between materials with different hardness such as metal and a resin, plastic deformation of one of them (cam groove side) is also prevented.

Figure 17:
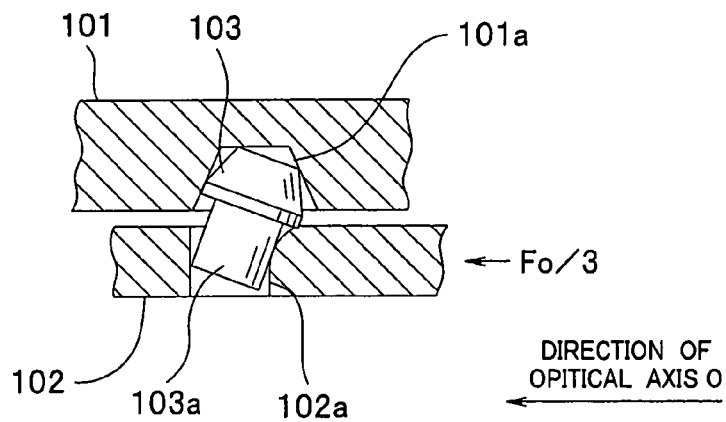
FIG. 17 is a sectional view illustrating a state where the cam mechanism portion in FIG. 14 receives the impact force and the cam follower is removed.
Figure 18:
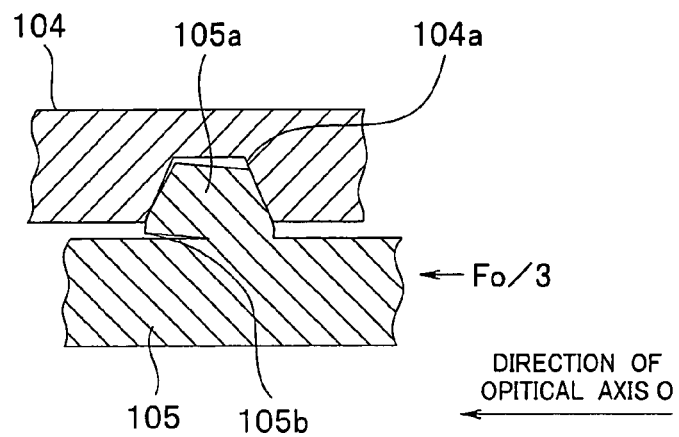
FIG. 18 is a sectional view illustrating a state where the cam mechanism portion in FIG. 15 receives an impact force and the root of the cam follower is damaged.

As mentioned above, according to the lens barrel 1 of this embodiment, the shaft member 14A made of metal is pressed into and inserted into the center portion of the cam follower 4Af provided at the first group frame 4 so as to increase the strength of the cam follower 4Af, and even if a relatively large impact force acts between it and the cam groove 3c, breakage of the cam follower 4Af can be prevented, and the cam follower will not be removed as in the case of the cam mechanism portion in the conventional lens barrel shown in FIG. 17. Also, the cam follower 4Af and the cam groove 3c are both formed by a resin member, and metal and a resin are not brought into contact as in the case of the conventional cam mechanism portion but resins are brought into contact with each other, which also prevents plastic deformation of the cam groove side. Moreover, it becomes possible to make the diameter of the cam follower smaller by inserting the shaft member 14A into the cam follower 4Af, by which the width of the cam groove is narrowed and the size of the lens barrel can be reduced. Also, a member obtained only by cutting a line material or a spring pin can be used as it is for the shaft member 14A, which will not increase costs.

Next, a cam mechanism portion incorporated in a lens barrel of a second embodiment of the present invention will be described using FIG. 5.

Figure 5:
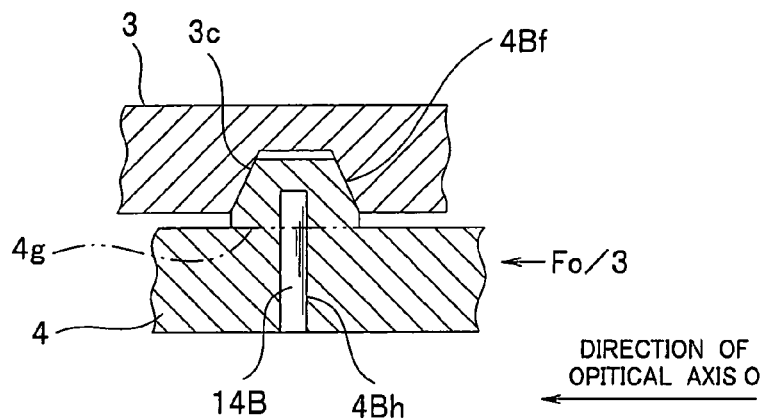
FIG. 5 is a sectional view along the optical axis around the cam groove and the cam follower constituting a cam mechanism portion incorporated in a lens barrel of a second embodiment of the present invention.

FIG. 5 is a sectional view along the optical axis around the cam groove and the cam follower, which is the cam mechanism portion incorporated in the lens barrel of this embodiment.

The lens barrel of this embodiment has the same configuration as that of the lens barrel 1 of the first embodiment except the cam mechanism portion. Therefore, the same reference numerals are given to the same constituent members and different configuration portions will be described below.

In the lens barrel of this embodiment, too, three cam grooves 3c are similarly provided at the rotating frame 3. On the other hand, three cam followers 4Bf are provided on the outer circumference portion of the first group frame 4. The cam follower 4Bf is formed by a resin integrally with the first group frame 4, and the outer circumference has a truncated cone shape capable of being engaged with the inclined face of the cam groove 3c of the rotating frame 3 with the axis along the radial direction. Also, the straight shaft member 14B made of metal is pressed into a bottomed hole 4Bh along the radial direction or inserted from the inner circumference side and fixed by adhesion (fitted state). The shaft member 14B may be inserted by insert molding with respect to the first group frame 4. In the above inserted state, the shaft member 14B is placed across the boundary 4g between the cam follower 4Bf and the outer circumference face of the first group frame 4. The lower end of the shaft member 14B is given chamfering processing.

According to the cam mechanism portion of the lens barrel of this embodiment, if a relatively large impact force such as a drop or the like acts between the cam follower 4Bf and the cam groove 3c, the same action and effects as that of the cam mechanism portion of the lens barrel 1 in the first embodiment are exerted. In the case of the lens barrel of this embodiment, particularly, since the upper end of the shaft member 14B is not exposed from the cam follower 4Bf, an edge portion at the upper end of the shaft member 14B does not scratch the cam groove 3c or the like at assembling.

Next, a cam mechanism portion incorporated in a lens barrel of a third embodiment of the present invention will be described using FIG. 6.

Figure 6:
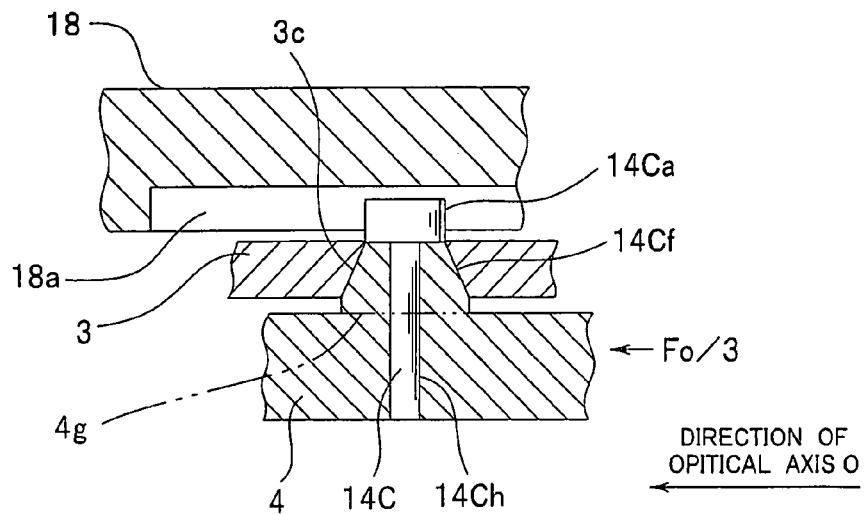
FIG. 6 is a sectional view along the optical axis around the cam groove and the cam follower constituting a cam mechanism portion incorporated in a lens barrel of a third embodiment of the present invention.

FIG. 6 is a sectional view along the optical axis around a cam groove and a cam follower of the cam mechanism portion incorporated in the lens barrel of this embodiment.

In the lens barrel of this embodiment, a straight moving frame 18 shown in FIG. 6 is additionally provided as a constituent frame member with respect to the first embodiment, and the straight moving frame 18 is straightly guided by the cam follower of the first group frame. The other constructions are the same. Therefore, the same reference numerals are given to the same constituent members and different construction portions will be described below.

The same constituent members as those of the first embodiment are given the same reference numerals, and the different constituent portions will be described below.

The first group frame 4 is provided with three cam followers 4Cf on the outer circumference portion. The cam follower 4Cf is formed by a resin integrally with the first group frame 4, and the outer circumference portion is capable of engagement with the inclined surface of the cam groove 3c of the rotating frame 3 and has the axis in the truncated cone shape along the radial direction. Also, into a through hole 4Ch along the radial direction of the center portion of the cam follower 4Cf, a straight shaft member 14C having a head portion guide part 14Ca made of metal is pressed or inserted from the outer circumference side and fixed by adhesion (fitted state). The shaft member 14C may be inserted by insert molding with respect to the first group frame 4. In the above inserted state, the shaft member 14C is placed across the boundary 4g between the cam follower 4Cf and the outer circumferential face of the first group frame 4, and moreover, the head portion guide part 14Ca is held in the exposed state on the upper portion of the cam follower. The lower end of the shaft member 14C is given chamfering processing.

The head portion guide part 14Ca of the shaft member 14C is engaged with a straight guide groove 18a of the straight moving frame 18 inserted into the outer circumference of the rotating frame 3. Therefore, rotation of the straight moving frame 18 is restricted by the first group frame 4 and advanced/retreated in the optical axis direction.

According to the cam mechanism portion of the lens barrel of this embodiment, even if a relatively large impact force such as drop acts between the cam follower 4Cf and the cam groove 3c, breakage of the cam follower 4Cf and the cam groove 3c can be prevented, and the same actions and effects as those of the cam mechanism portion of the lens barrel 1 of the first embodiment can be exerted.

Particularly, in the case of the cam mechanism portion of this embodiment, by providing the head portion guide part 14Ca exposed at the upper part of the shaft member 14C, rotation of the straight moving frame 18, which is another frame member, can be restricted. Alternatively, the head portion guide part 14Ca can be used as a cam follower to advance/retreat the other frame members.

Next, a cam mechanism portion incorporated in a lens barrel of a fourth embodiment of the present invention will be described using FIG. 7.

Figure 7:
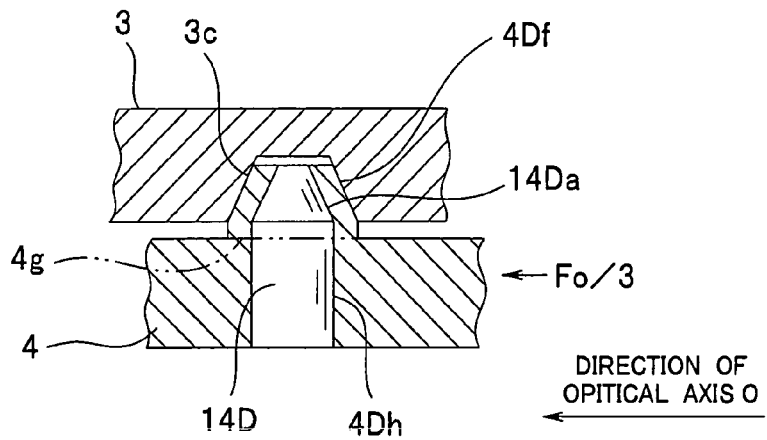
FIG. 7 is a sectional view along the optical axis around the cam groove and the cam follower constituting a cam mechanism portion incorporated in a lens barrel of a fourth embodiment of the present invention.

FIG. 7 is a sectional view along the optical axis around a cam groove and a cam follower constituting the cam mechanism portion incorporated in the lens barrel of this embodiment.

The lens barrel of this embodiment has the same configuration as that of the lens barrel 1 of the first embodiment other than the above cam mechanism portion. Therefore, the same reference numerals are given to the same constituent members and different constituent portions will be described below.

In this lens barrel of this embodiment, too, three cam followers 4Df are similarly provided on the outer circumference portion of the first group frame 4. This cam follower 4Df is formed by a resin integrally with the first group frame 4, and the outer circumference portion is capable of engagement with the inclined surface of the cam groove 3c of the rotating frame 3, and the axis has a truncated cone shape along the radial direction. Also, into a through hole 4Dh having a tapered portion along the radial direction of the center portion of the cam follower 4Df, a straight shaft member 14D made of metal on which a tip-end tapered surface 14Da is formed is pressed or inserted from the inner circumference side and fixed (fitted state). The shaft member 14D may be inserted by insert molding with respect to the first group frame 4. The tip-end tapered surface 4Da of the shaft member 14D is a tapered surface in parallel with the taper of the truncated cone shape of the cam follower 4Df (that is, the similar shape). Also, the shaft member 14D in the inserted state is placed across the boundary 4g between the cam follower 4Df and the outer circumferential face of the first group frame 4. The upper and the lower ends of the shaft member 14D are given chamfering processing.

According to the cam mechanism portion of the lens barrel of this embodiment, even if a relatively large impact force such as drop acts between the cam follower 4Df and the cam groove 3c, breakage of the cam follower 4Df and the cam groove 3c can be prevented, and the same actions and effects as those of the cam mechanism portion of the lens barrel 1 of the first embodiment can be exerted.

Particularly in the case of the cam mechanism portion of this embodiment, even if the diameter of the cam follower 4Df is reduced, sufficient bending strength and shearing strength can be obtained by the size of the diameter of the root portion of the shaft member 14D, and thus, the width of the cam groove 3c can be reduced, which enables reduction of the size of the lens barrel.

Next, a cam mechanism portion incorporated in a lens barrel of a fifth embodiment of the present invention will be described using FIG. 8.

Figure 8:
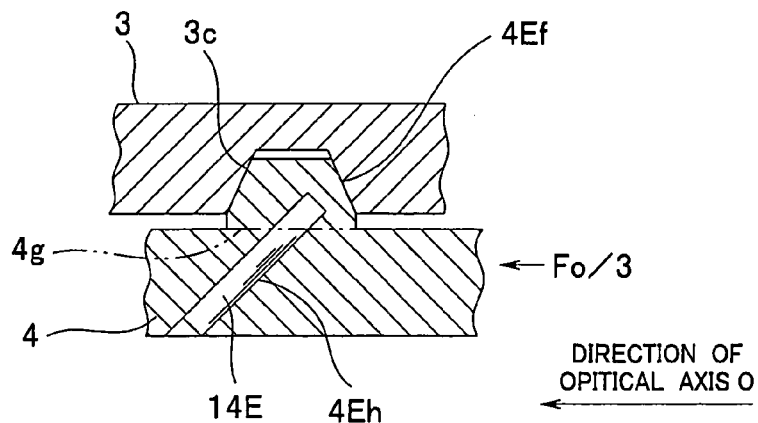
FIG. 8 is a sectional view along the optical axis around the cam groove and the cam follower constituting a cam mechanism portion incorporated in a lens barrel of a fifth embodiment of the present invention.

FIG. 8 is a sectional view along the optical axis around a cam groove and a cam follower constituting the cam mechanism portion incorporated in the lens barrel of this embodiment.

The lens barrel of this embodiment has the same configuration as that of the lens barrel 1 of the first embodiment other than the above cam mechanism portion. Therefore, the same reference numerals are given to the same constituent members and different constituent portions will be described below.

In this lens barrel of this embodiment, too, three cam followers 4Ef are provided on the outer circumference portion of the first group frame 4. This cam follower 4Ef is formed by a resin integrally with the first group frame 4, and the outer circumference portion is capable of engagement with the inclined surface of the cam groove 3c of the rotating frame 3, and the axis has a truncated cone shape along the radial direction. Also, into a bottomed hole 4Eh inclined with respect to the radial direction inside the cam follower 4Ef, a straight shaft member 14E made of metal is pressed or inserted from the inner circumference side and fixed (fitted state). The shaft member 14E may be inserted by insert molding with respect to the first group frame 4.

The shaft member 14E is inserted with inclination along the surface including the optical axis with respect to the axis of the cam follower 4Ef. Also, the shaft member 14E in that state is placed diagonally across the boundary 4g between the cam follower 4Ef and the outer circumferential face of the first group frame 4. Moreover, the lower end of the shaft member 14E is given chamfering processing.

According to the cam mechanism portion of the lens barrel of this embodiment, even if a relatively large impact force such as drop acts between the cam follower 4Ef and the cam groove 3c, breakage of the cam follower 4Ef and the cam groove 3c can be prevented, and the same actions and effects as those of the cam mechanism portion of the lens barrel 1 of the first embodiment can be exerted.

Particularly, in the case of the cam mechanism portion of this embodiment, by diagonally inserting the shaft member 14E made of metal into the center portion of the cam follower 4Ef provided on the first group frame 4 as mentioned above, bending and shearing strength of the cam follower 4Ef is further increased, the fitting length of the shaft member 14E into the cam follower 4Ef is prolonged, and the cam follower strength can be further enhanced.

Next, a cam mechanism portion incorporated in a lens barrel of a sixth embodiment of the present invention will be described using FIG. 9.

Figure 9:
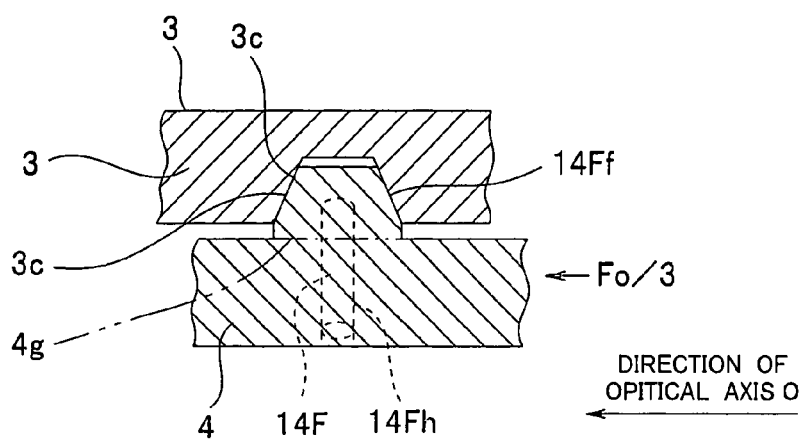
FIG. 9 is a sectional view along the optical axis around the cam groove and the cam follower constituting a cam mechanism portion incorporated in a lens barrel of a sixth embodiment of the present invention.

FIG. 9 is a sectional view along the optical axis around a cam groove and a cam follower constituting the cam mechanism portion incorporated in the lens barrel of this embodiment.

The lens barrel of this embodiment has the same configuration as that of the lens barrel 1 of the first and the fifth embodiments other than the above cam mechanism portion. Therefore, the same reference numerals are given to the same constituent members and different constituent portions will be described below.

In this lens barrel of this embodiment, too, three cam followers 4Ff are provided on the outer circumference portion of the first group frame 4. The cam follower 4Ff is formed by a resin integrally with the first group frame 4, and the outer circumference portion is capable of engagement with the inclined surface of the cam groove 3c of the rotating frame 3, and the axis has a truncated cone shape along the radial direction. Also, into a bottomed hole 4Fh inclined with respect to the radial direction inside the cam follower 4Ff, a straight shaft member 14F made of metal is pressed or inserted from the inner circumference side and fixed (fitted state). The shaft member 14F may be inserted by insert molding with respect to the first group frame 4.

The shaft member 14F is inserted with inclination along the surface orthogonal to the optical axis with respect to the axis of the cam follower 4Ff. Also, the shaft member 14F in the inserted state is placed diagonally across the boundary 4g between the cam follower 4Ff and the outer circumferential face of the first group frame 4. Moreover, the lower end of the shaft member 14F is given chamfering processing.

According to the cam mechanism portion of the lens barrel of this embodiment, even if a relatively large impact force such as drop acts between the cam follower 4Ff and the cam groove 3c, breakage of the cam follower 4Ff and the cam groove 3c can be prevented, and the same actions and effects as those of the cam mechanism portion of the lens barrel 1 of the fifth embodiment can be exerted.

Particularly, in the case of the cam mechanism portion of this embodiment, since the shaft member 14F is inserted in the inclined state on the surface where the shaft member 14F is orthogonal to the optical axis, an occupied space of the shaft member 14F in the optical axis direction is small and the size increase of the lens barrel by insertion of the shaft member 14F can be avoided.

Next, a cam mechanism portion incorporated in a lens barrel of a seventh embodiment of the present invention will be described using FIGS. 10 and 11.

Figure 10:
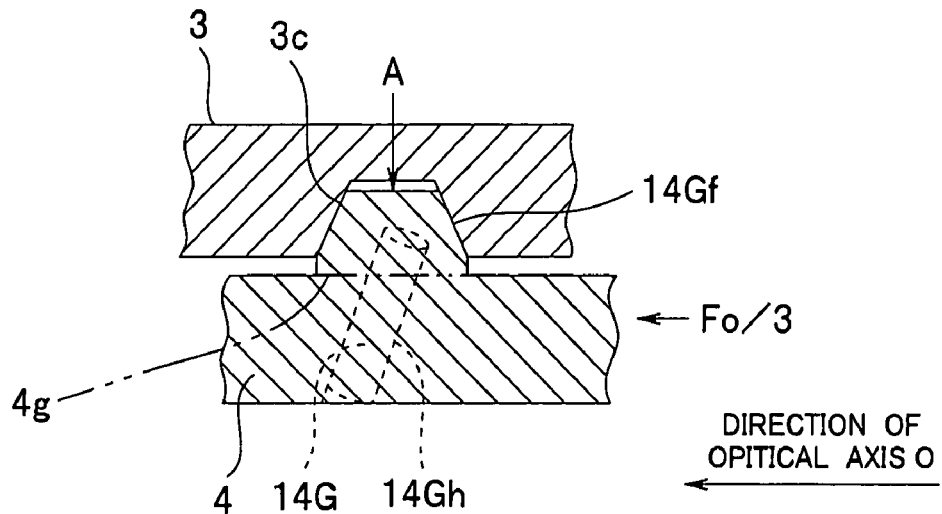
FIG. 10 is a sectional view along the optical axis around the cam groove and the cam follower constituting a cam mechanism portion incorporated in a lens barrel of a seventh embodiment of the present invention.
Figure 11:
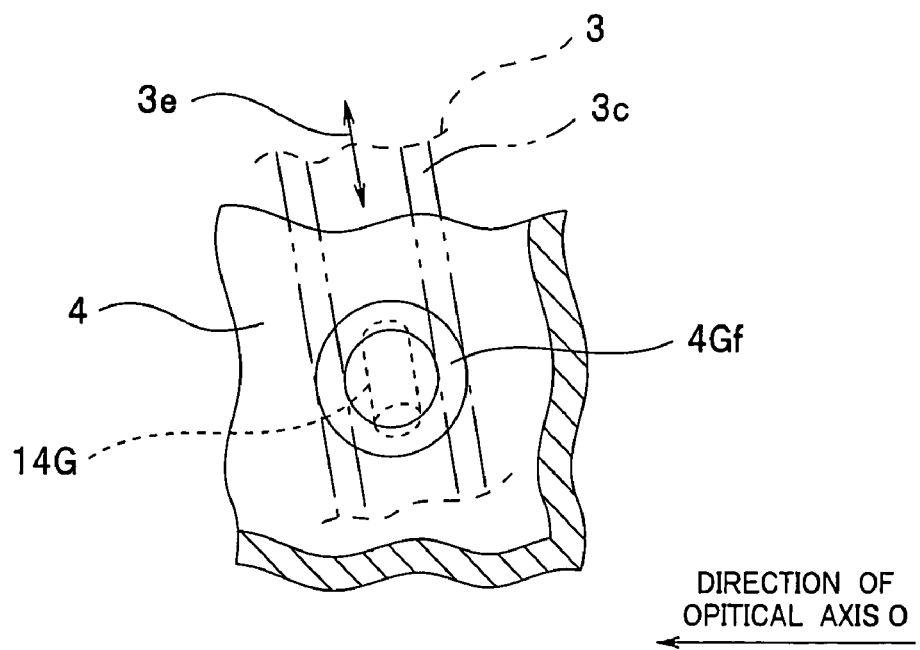
FIG. 11 is a view on arrow A of FIG. 10.

FIG. 10 is a sectional view along the optical axis around a cam groove and a cam follower constituting the cam mechanism portion incorporated in the lens barrel of this embodiment. FIG. 11 is a view on arrow A in FIG. 10 and illustrates a state of a cam follower portion seen from above.

The lens barrel of this embodiment has the same configuration as that of the lens barrel 1 of the first and the fifth embodiments other than the above cam mechanism portion. Therefore, the same reference numerals are given to the same constituent members and different constituent portions will be described below.

In this lens barrel of this embodiment, too, three cam followers 4Gf are provided on the outer circumference portion of the first group frame 4. The outer circumference portion of the cam follower 4Gf is formed by a resin integrally with the first group frame 4 and is capable of engagement with the inclined surface of the cam groove 3c of the rotating frame 3, and the axis has a truncated cone shape along the radial direction. Also, into a bottomed hole 4Gh inclined with respect to the radial direction inside the cam follower 4Gf, a straight shaft member 14G made of metal is pressed or inserted from the inner circumference side and fixed (fitted state). The shaft member 14G may be inserted by insert molding with respect to the first group frame 4.

The shaft member 14G is inserted with inclination along a cam line 3e of the cam groove 3c of the rotating frame 3 with respect to the axis of the cam follower 4Gf. Also, the shaft member 14G in the inserted state is placed diagonally across the boundary 4g between the cam follower 4Gf and the outer circumferential face of the first group frame 4. Moreover, the lower end of the shaft member 14G is given chamfering processing.

According to the cam mechanism portion of the lens barrel of this embodiment, even if a relatively large impact force such as drop acts between the cam follower 4Gf and the cam groove 3c, breakage of the cam follower 4Gf and the cam groove 3c can be prevented, and the same actions and effects as those of the cam mechanism portion of the lens barrel 1 of the fifth embodiment can be exerted.

Particularly, in the case of the cam mechanism portion of this embodiment, since the shaft member 14G made of metal is inserted in the inclined state along the cam line 3e of the cam groove 3c into the cam follower 4Gf provided at the first group frame 4 as mentioned above, an occupied space of the shaft member 14G in the optical axis direction is small and the size increase of the lens barrel by insertion of the shaft member 14G can be avoided.

Next, a cam mechanism portion incorporated in a lens barrel of an eighth embodiment of the present invention will be described using FIGS. 12 and 13.

Figure 12:
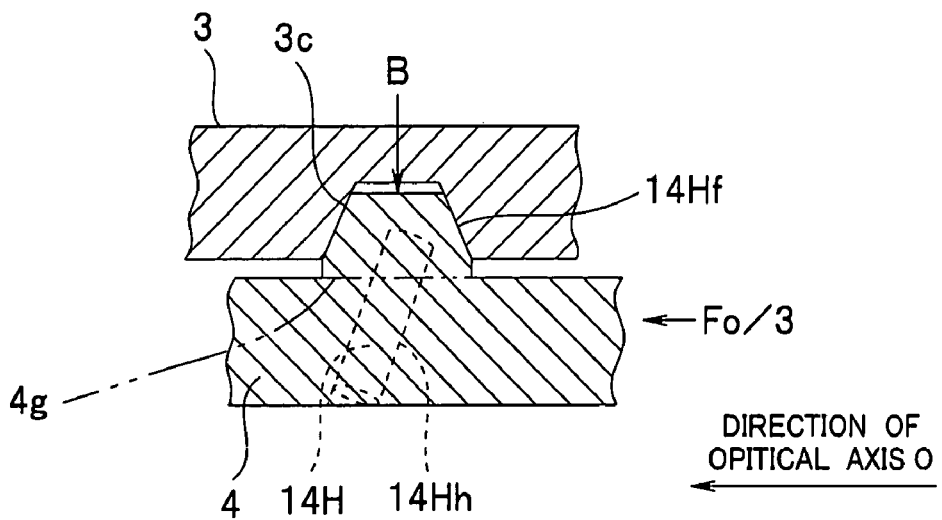
FIG. 12 is a sectional view along the optical axis around the cam groove and the cam follower constituting a cam mechanism portion incorporated in a lens barrel of a eighth embodiment of the present invention.
Figure 13:
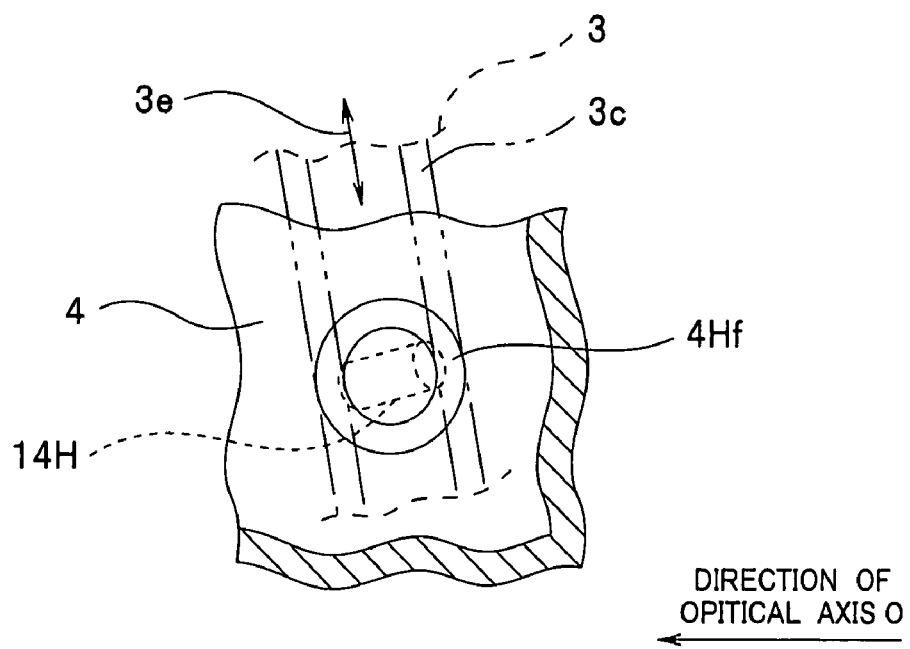
FIG. 13 is a view on arrow B of FIG. 12.
Figure 14:
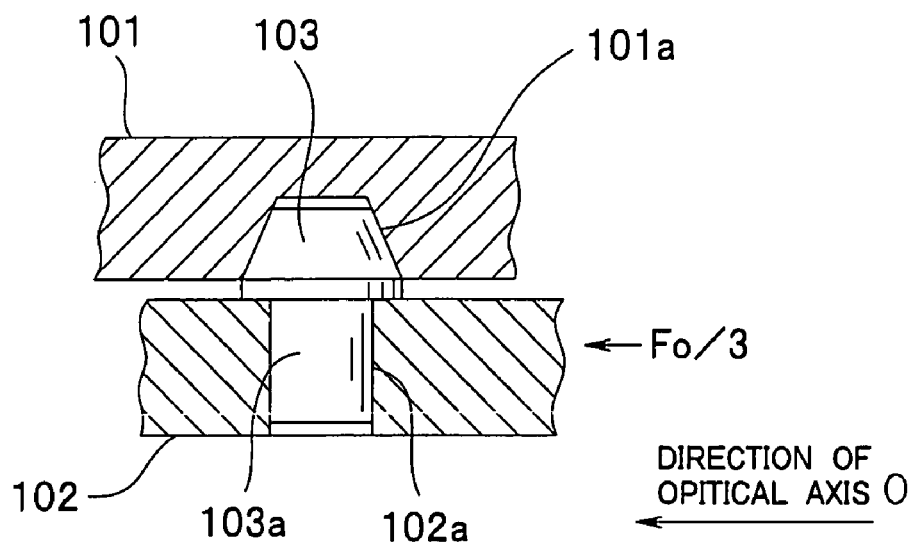
FIG. 14 is a sectional view around the cam groove and the cam follower constituting a cam mechanism portion applied to a conventional lens barrel.
Figure 15:
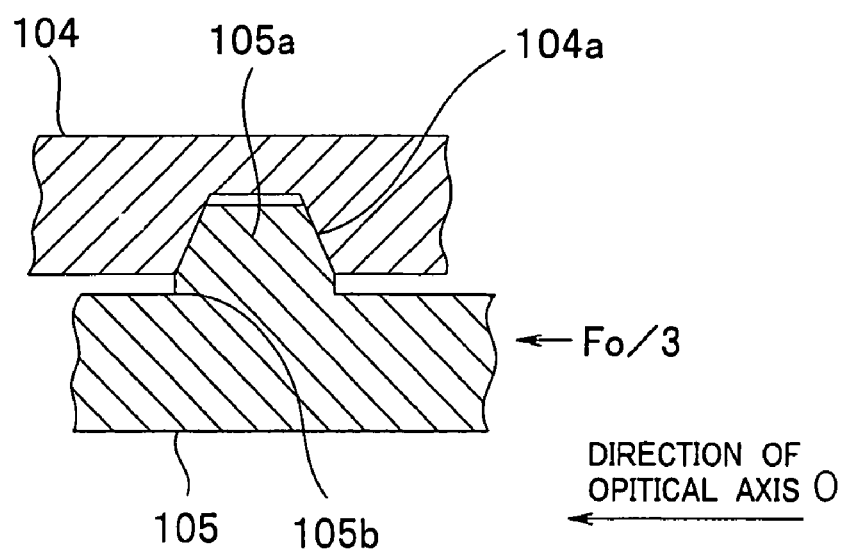
FIG. 15 is another sectional view around the cam groove and the cam follower constituting another cam mechanism portion applied to a conventional lens barrel.
Figure 16:
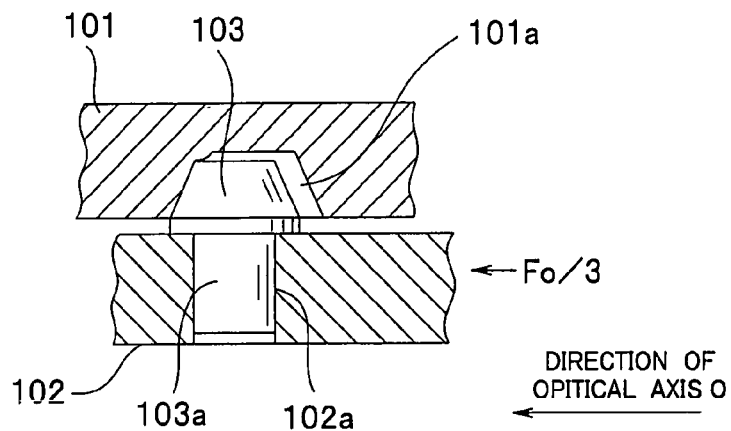
FIG. 16 is a sectional view illustrating a deformed state of the cam groove when the cam mechanism portion in FIG. 14 receives an impact force.

FIG. 12 is a sectional view along the optical axis around a cam groove and a cam follower constituting the cam mechanism portion incorporated in the lens barrel of this embodiment. FIG. 13 is a view on arrow B in FIG. 12 and illustrates a state of a cam follower portion seen from above.

The lens barrel of this embodiment has the same configuration as that of the lens barrel 1 of the first and the fifth embodiments other than the above cam mechanism portion. Therefore, the same reference numerals are given to the same constituent members and different constituent portions will be described below.

In this lens barrel of this embodiment, too, three cam followers 4Hf are provided on the outer circumference portion of the first group frame 4. The outer circumference portion of the cam follower 4Hf is formed by a resin integrally with the first group frame 4 and is capable of engagement with the inclined surface of the cam groove 3c of the rotating frame 3, and the axis has a truncated cone shape along the radial direction (direction orthogonal to the optical axis). Also, into a bottomed hole 4Hh inclined inside the cam follower 4Hf, a straight shaft member 14H made of metal is pressed or inserted from the inner circumference side and affixed and fixed (fitted state). The shaft member 14H may be inserted by insert molding with respect to the first group frame 4.

The shaft member 14H is inserted in the inclined state along the direction orthogonal to the cam line 3e of the cam groove 3c of the rotating frame 3 with respect to the axis of the cam follower 4Hf. Also, the shaft member 14H in the inserted state is placed diagonally across the boundary 4g between the cam follower 4Hf and the outer circumferential face of the first group frame 4. Moreover, the lower end of the shaft member 14H is given chamfering processing.

According to the cam mechanism portion of the lens barrel of this embodiment, even if a relatively large impact force such as drop acts between the cam follower 4Hf and the cam groove 3c, breakage of the cam follower 4Hf and the cam groove 3c can be prevented, and the same actions and effects as those of the cam mechanism portion of the lens barrel 1 of the fifth embodiment can be exerted.

Particularly, in the case of the cam mechanism portion of this embodiment, since the shaft member 14H made of metal is inserted diagonally along the direction orthogonal to the cam line 3e of the cam groove 3c into the cam follower 4Hf provided at the first group frame 4 as mentioned above, an occupied space of the shaft member 14H in the circumferential direction is reduced and the size increase of the lens barrel by insertion of the shaft member 14H can be avoided.

Each of the shaft members 14E to 14H applied to the cam mechanism portion of the lens barrel of the above-mentioned fifth to the eighth embodiments is inclined in a predetermined direction with respect to the optical axis, but the bending moment strength and shearing strength of the cam follower are increased even if the shaft member is inclined in an arbitrary direction with respect to the optical axis, and the same effects can be obtained.

Also, in each of the above-mentioned embodiments, a case where the frame member side where the cam follower is provided receives an external impact was described, but not limited to this, if the similar configuration is applied to the lens barrel constructed to receive the external impact at the frame member side where the cam groove is provided, the same effects can be exerted.

Also, the shaft member is described as a metal material in each of the above embodiment, but it is only necessary that the shaft member is made of a material whose mechanical strength is higher than that of the material of the frame, and the shaft member may be made of a synthetic resin material. In general, the frame member is preferably made of a material such as a polycarbonate resin containing glass fiber, carbon fiber and the like, and having high mechanical strength. However, since injection molding conditions for molding the frame member are limited, simple employment of a material with higher strength is not capable of injection molding. Therefore, it is effective if the frame material uses a resin material with appropriate strength, while the shaft member in a relatively simple shape of the present invention uses a material having mechanical strength higher than that of the material of the frame member.

The present invention is not limited to each of the above embodiments but various variations can be put into practice in a range not departing from the gist. Moreover, each of the embodiments includes inventions in various stages, and various inventions can be extracted by combining the plurality of disclosed constituent requirements as appropriate.

What is claimed is:

1. A lens barrel comprising:
   a first frame having a cam groove;
   a second frame made of a synthetic resin and movable relative to the first frame;
   a cam follower provided on the second frame, integrated with the second frame, and engaged with the cam groove; and
   a shaft member made of a material which is mechanically stronger than the synthetic resin and inserted into the cam follower without contacting the cam groove.

2. The lens barrel according to claim 1, wherein the shaft member is inserted into the cam follower across a boundary between the cam follower and the circumferential surface.

3. The lens barrel according to claim 1, wherein the shaft member is inserted with inclination with respect to the axis made by the cam follower.

4. The lens barrel according to claim 3, wherein the shaft member is inclined in a direction of a cam line of the cam groove.

5. The lens barrel according to claim 3, wherein the shaft member is inclined in a direction orthogonal to the cam line of the cam groove.

6. The lens barrel according to claim 1, wherein the shaft member projects outside of the cam follower.

7. The lens barrel according to claim 6, wherein a portion of the shaft member projecting outside the cam follower further has a function of a cam follower to be engaged with another groove different from the cam groove.

8. The lens barrel according to claim 1, wherein the shaft member has the shape of a portion inserted into the cam follower similar to the shape of the cam follower.

9. The lens barrel according to claim 1, wherein the shaft member is a spring pin.

10. The lens barrel according to claim 1, wherein the shaft member is made of an aluminum material.

11. The lens barrel according to claim 1, wherein the shaft member is made of metal.

* * * * *